(12) United States Patent
Iwata

(10) Patent No.: US 6,685,081 B2
(45) Date of Patent: Feb. 3, 2004

(54) FRICTIONAL AGITATION JOINING METHOD AND APPARATUS THEREFOR

(75) Inventor: Masaru Iwata, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 22 days.

(21) Appl. No.: 10/058,348

(22) Filed: Jan. 30, 2002

(65) Prior Publication Data

US 2002/0109002 A1 Aug. 15, 2002

(30) Foreign Application Priority Data

Feb. 14, 2001 (JP) .......................... 2001-036326

(51) Int. Cl.[7] .................... B23K 20/12; B23K 37/02
(52) U.S. Cl. ..................... 228/112.1; 228/2.1
(58) Field of Search ................. 228/112.1, 2.1; 156/73.5

(56) References Cited

U.S. PATENT DOCUMENTS

| | | | |
|---|---|---|---|
| 5,460,317 A | 10/1995 | Thomas | |
| 5,979,742 A * | 11/1999 | Enomoto et al. | 228/112.1 |
| 6,050,474 A * | 4/2000 | Aota et al. | 228/112.1 |
| 6,193,137 B1 * | 2/2001 | Ezumi et al. | 228/112.1 |
| 6,311,889 B1 * | 11/2001 | Ezumi et al. | 228/112.1 |
| 6,325,273 B1 * | 12/2001 | Boon et al. | 228/112.1 |
| 2002/0109002 A1 * | 8/2002 | Iwata | |
| 2003/0042291 A1 * | 3/2003 | Mahoney | |

FOREIGN PATENT DOCUMENTS

| | | |
|---|---|---|
| EP | 0 296 568 | 12/1988 |
| EP | 0 985 483 | 3/2000 |
| JP | 411058037 A * | 3/1999 |
| JP | 411320127 A * | 11/1999 |
| JP | 2000-33484 | 2/2000 |
| JP | 2000-158154 | 6/2000 |
| JP | 2000-167676 | 6/2000 |
| JP | 2000-176655 | 6/2000 |
| JP | 2000-317654 | 11/2000 |
| JP | 02002239756 A * | 8/2002 |

OTHER PUBLICATIONS

Translation of JP–2000158154.*
Translation of JP–2000317654.*

* cited by examiner

Primary Examiner—Kiley Stoner
(74) Attorney, Agent, or Firm—Foley & Lardner

(57) ABSTRACT

Joining flange portions F1, F2 which are previously formed on members W1, W2 to be joined are caused to butt on each other to form an edge joint. A projecting rod 3 of an agitation rod 1 is inserted in an opposition gap between end portion inner faces S1, S2 from the side of end faces E1, E2 of the joining flange portions F1, F2 so that a shoulder face 4 of the agitation rod 1 is brought in close contact with the end faces E1, E2. A frictional agitation joining is continuously performed on the joining flange portions F1, F2 curved in 3-dimensional manner by feeding the joining flange portions F1, F2 in their longitudinal directions while rotating the agitation rod 1.

9 Claims, 11 Drawing Sheets

DURING JOINING

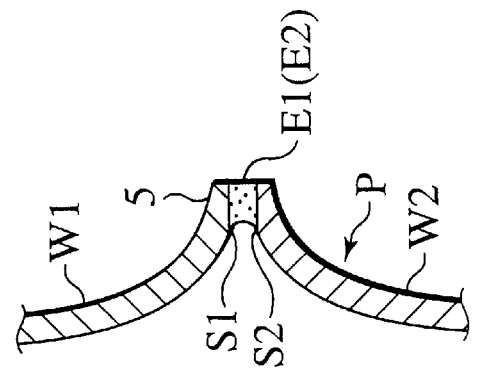
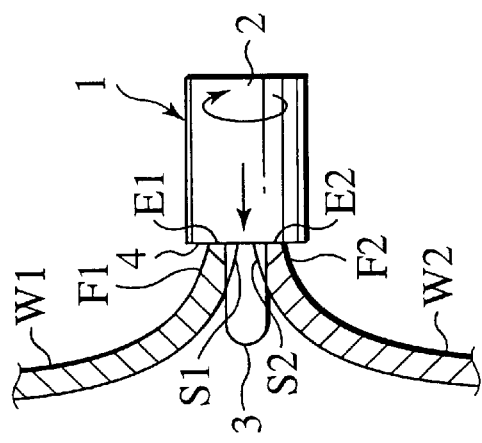
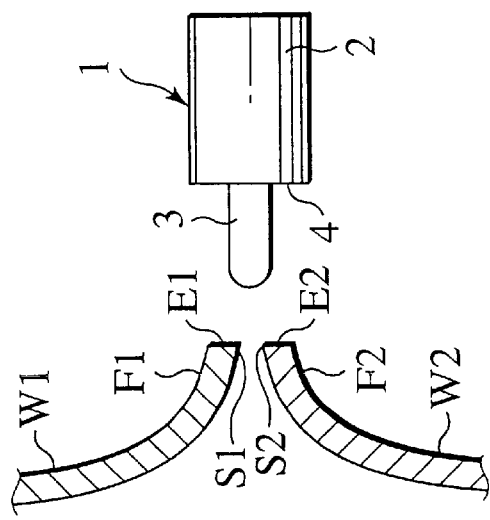

BEFORE JOINING

DURING JOINING

AFTER JOINING

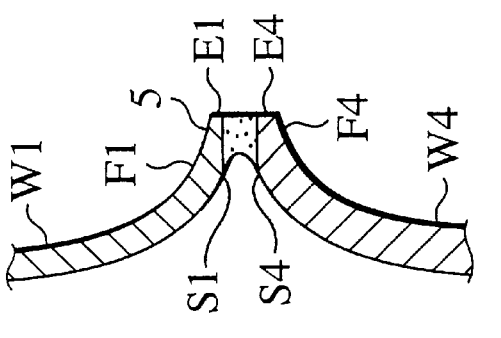
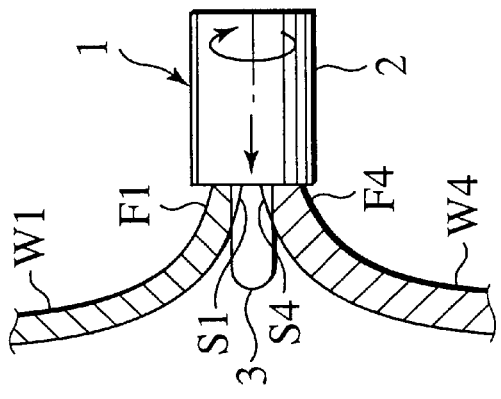
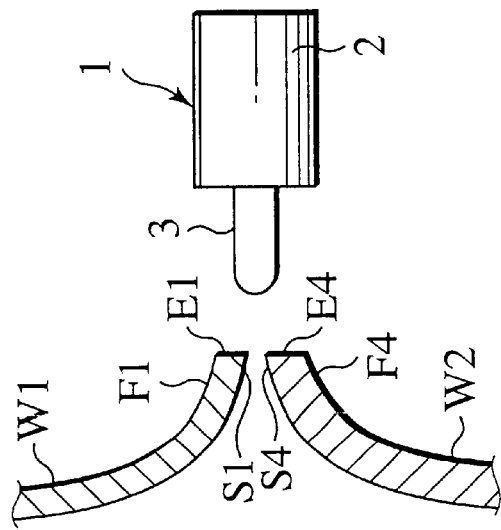
FIG.9A BEFORE JOINING
FIG.9B DURING JOINING
FIG.9C AFTER JOINING

FRICTIONAL AGITATION JOINING METHOD AND APPARATUS THEREFOR

BACKGROUND OF THE INVENTION

The present invention relates to improvement in frictional agitation joining method and apparatus therefor which are suitable for joining light alloys such as aluminum, aluminum alloy or the like, and in particular to a frictional agitation joining method capable of joining two sheets of members to be joined in a form of substantially an edge joint, and a method therefor.

As shown in FIGS. 1 and 2, a frictional agitation joining method is conducted such that a circular rod-shaped agitation rod 102 having a projecting portion 101 at its distal end is caused to advance in between members W to be joined such as an aluminum alloy in a pressurizing manner while being rotated to generate frictional heat and the heat is conducted to the members W to be joined while the agitation rod is being fed along a joining line 103 so that the members W are joined.

In the joining, the members W to be joined is softened at a temperature of about 70% of their melting points and the softened portions are plastically fluidized according to rotating and feeding of the agitation rod 102 so that joining of the members W is completed as they are in a solid phase state. Incidentally, as the agitation rod 102, a rod made from a tool steel, a stainless steel can be used, and the length of the projecting portion 101, namely a length to be invaded between the members W to be joined, is about the thickness of butting portions of the members W to be joined.

Shoulder faces 104 corresponding to shoulder portions of the projecting portions 101 prevents portions of the members W to be joined from being pressed outside when the projecting portion 101 advances in between the members W to be joined, and they serve to apply frictional heat from the surfaces of the members W to be joined. The members W to be joined which serve as a butting joint are placed on a backing metal 105, or a holding mechanism for supporting the members 4 from their back sides is provided at a position corresponding to that of the backing metal, so that an axial pressurizing force of the agitation rod 102 can be sustained by the backing metal or the holding mechanism.

In such a frictional agitation joining method, there are advantages that (1) there is hardly joined strain, (2) a joined attitude is not limited to specific ones, (3) a high speed joining can be achieved due to a high energy efficiency, (4) there are not any defects such as a bubbles, cracks or the like in a joined joint portion, (5) parameters for joining to be controlled are only the number of rotations and the pressurizing force of the agitation rod, (6) even a material such as DURALUMIN or the like which is considered to be difficult to melt-weld can be joined, and so on.

Incidentally, such a frictional agitation joining technique has been described in Japanese Patent Application Laid-Open (JP-A) No. 2000-33484 publication, JP-A 2000-167676 and the like.

SUMMARY OF THE INVENTION

In the above related frictional agitation joining technique, however, the backing metal 105 of the members W to be joined for sustaining the axial pressurizing force of the agitation rod 102 and a controlling/holding mechanism for rotating and feeding the agitation rod 102 in conformal with the joining line 103 are required, so that the conventional frictional agitation joining technique can not be employed for joining a member for a joint structure curved in a 3-dimensional manner, more specifically, a member of sandwiched structure such as a suspension member of an automobile.

Also, since a butting joint form is employed for a joint structure in many cases, it is necessary to control a clearance "a" and unevenness "b" of a joint, as shown in FIG. 3, and the degree of freedom for design is made small. Furthermore, when members W, W to be joined to each other, whose plate thicknesses are different from each other are joined to each other, a difference thickness adjusting margin "c" achieved by the backing metal 106 is required, as shown in FIG. 4, which results in increase in cost.

The present invention has been made in view of the above problems, and an object thereof is to provide a frictional agitation joining method which allows joining mainly by not a butting joint form but a so-called edge joint form to be applied to a 3-dimensionally curved joint structure and a method therefor.

In order to achieve the above object, the present invention is configured such that two plate-shaped members to be joined are superimposed one on another such that end faces thereof constitutes generally an edge joint form, and joining is performed by applying frictional agitation energy to the end faces of both the members and inside faces of the members which are positioned near the end faces and are superimposed one on another.

An aluminum member, an aluminum alloy member or another light alloy material similar thereto is representative of the member to be joined. The shape of the member to be joined includes any approximate edge joint form whose joining portion may be curved in a 2-dimensional or 3-dimentional manner is constituted.

BRIEF DESCRIPTION OF THE DRAWINGS

FIG. 5A is an explanatory view for explaining one step of steps of a frictional agitation joining method of a first embodiment of the present invention, the one step showing a state before joining;

FIG. 5B is an explanatory view for explaining one step of steps of the frictional agitation joining method of the first embodiment of the present invention, the one step showing a state during joining;

FIG. 5C is an explanatory view for explaining one step of steps of the frictional agitation joining method of the first embodiment of the present invention, the one step showing a state after joining;

FIG. 9A is an explanatory view for explaining one step of steps of a frictional agitation joining method of a third embodiment of the present invention, the one step showing a state before joining;

FIG. 9B is an explanatory view for explaining one step of steps of the frictional agitation joining method of the third embodiment of the present invention, the one step showing a state during joining;

FIG. 9C is an explanatory view for explaining one step of steps of the frictional agitation joining method of the third embodiment of the present invention, the one step showing a state after joining;

DETAILED DESCRIPTION OF THE PREFERRED EMBODIMENTS

Figure 6:
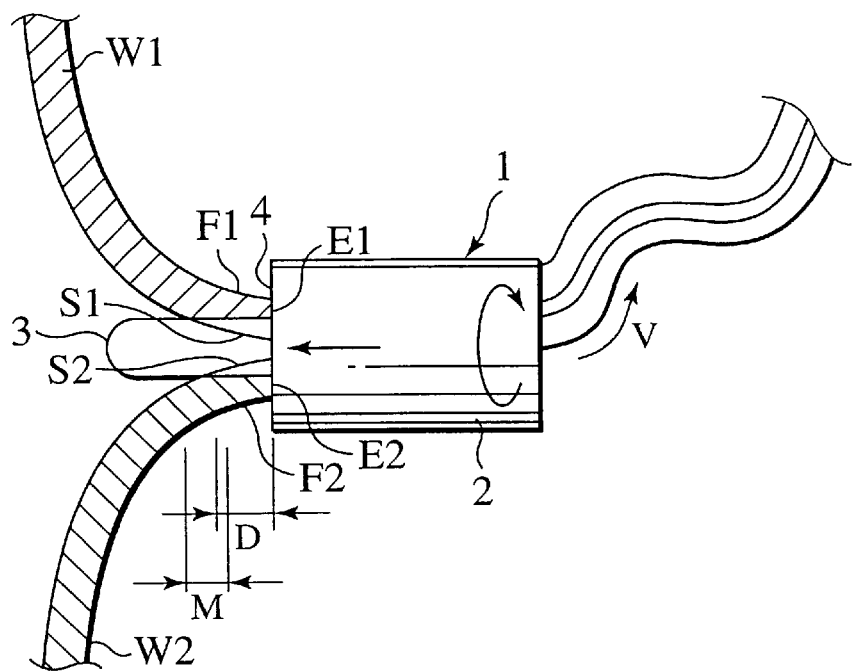
FIG. 6 is an explanatory enlarged view of a main portion shown in FIG. 5B.
Figure 7:
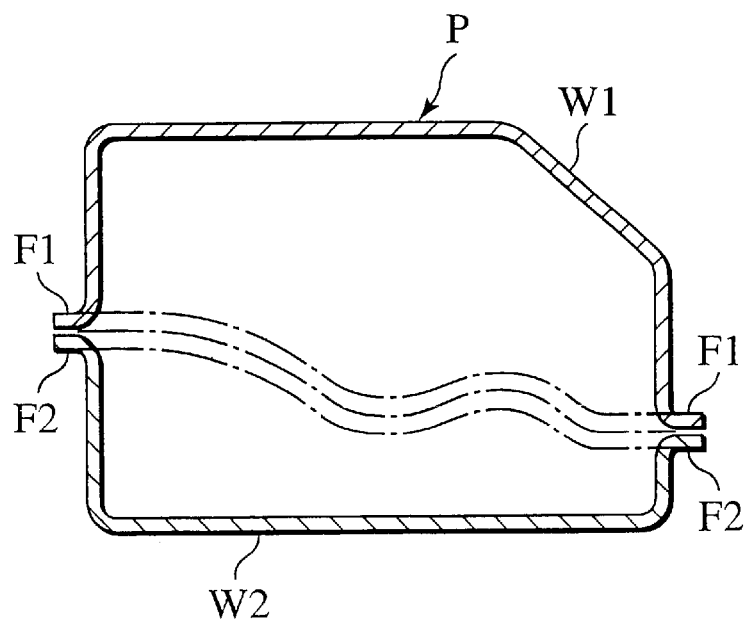
FIG. 7 is an explanatory sectional view showing one example of a member to be joined used in the frictional agitation joining method of the present invention.

FIGS. 5A to 7 show a first preferred embodiment of the present invention, where a part P having a covered binding type closed cross-sectional structure (so-called "fully-encased sandwich structure") is manufactured by joining two sheets of panel-shaped members W1, W2 with joining flange portions F1, F2 formed in advanced at the joining flange portions F1, F2 is shown, as specifically shown in FIG. 7.

As shown in FIGS. 5A to 7, two sheets of members W1, W2 to be joined which have been press-formed in predetermined shapes are curved over almost their entire peripheries so that joining flange portions F1, F2 of an outer flange type are formed in a bending manner and they are bend in a 3-dimensional manner along their longitudinal directions. The joining flange portions F1, F2 of both the members W1, W2 to be joined are superimposed one on anther and they are restrained in a pressurized manner to each other by predetermined means. That is, as shown in FIGS. 5A to 6, both the joining flange portions F1, F2 are superimposed one on another at a superimposed flanges and in an edge joint form, the joining flange portions F1, F2 are positioned such that their end faces E1, E2 are flush with each other, and curved end portion inner faces S1, S2 which are positioned just near the end faces E1, E2 are opposed to each other. Incidentally, the radius of curvature R of the curve varies in a range of about R0.5 to R50 in a similar figure for each constituent part. Also, the ratio R/t of the curvature R to the thickness t is in a range of about 0.2 to 10.

On the other hand, the agitation rod 1 used for the frictional agitation joining of the above joining flange portions F1, F2 is a staged shaft shape one having a projecting portion 3 at its distal end of a rod main body 2, as shown in FIG. 6, the diameter of the projecting portion 3 is set to a size of about the thickness of the each of the joining flange portions F1, F2, and the length of the projecting portion 3 is set to be longer than the depth D to be finally joined in a frictional agitation manner, as shown in FIG. 6.

While the agitation rod 1 is rotationally driven at a range of 100 to 2000 rpm or so, it is press-fitted in a gap between the end portion inner faces S1, S2 at a joining start position of the joining flange portions F1, F2 with an attitude at a right angle to the end faces E1, E2 in a penetrating manner, as shown in FIGS. 5B to 6. At this time, a press-fitting force (a pressurizing force) is set in a range of about 10 to 15 Mpa, at least a proximal portion outer peripheral face of the projecting portion 3 is press-fitted to the respective end portion inner faces S1, S2 of the respective joining flange portion F1, F2 and simultaneously a shoulder face 4 formed in a boundary region between the projecting portion 3 and the rod main body 2 are securely brought in close contact with the respective end faces E1, E2. At this time, the respective joining flange portions F1, F2 are opened or released from each other by a press-fitting force of the agitation rod 1, and the gap formed between the end portion inner faces S1, S2 is formed in a so-called reverse groove shape where it is gradually reduced towards the end faces E1, E2 because the respective end portion inner faces S1, S2 are curved. Incidentally, pressurizing of the shoulder face 4 of the agitation rod 1 to the end faces E1, E2 serves to reduce the gap, which is effective in joining. In the above manner, since the agitation rod 1 is inserted in between the end portion inner faces formed by superimposing the two sheets of the members W1, W2 to be joined in a form of an edge joint so that friction agitation is performed, it is unnecessary to use a backing metal. In the above state, by moving the agitation rod 1 along the longitudinal direction of the joining flange portions F1, F2 at a predetermined velocity V, the end faces E1, E2 and the end portion inner peripheral faces S1, S2 are agitated at their portions through which the agitation rod 1 has passed while they are being soften due to friction heat with the agitation rod 1, so that the members W1, W2 to be joined are joined in the frictional agitation manner in a form of a joint connection 5 such as almost a edge joint as if they are sewn to each other, as shown in FIG. 5C. As apparent from FIG. 6, assuming that the joined depth achieved by the frictional agitation joining is D, a tip end portion other than a portion of the projecting portion 3 of the agitation rod 1 corresponding to the depth D does not participate in the frictional agitation joining directly, but an ambit M of the projecting portion 3 which is adjacent to the joining depth D comes in contact with the curved end portion inner faces S1, S2. Then, when the agitation rod 1 is moved along the longitudinal direction of the 3-dimensionally curved joining flange portions F1, F2, a copying guide function for contacting of the ambit M of the projecting portion 3 and the end portion inner faces S1, S2 is developed so that the agitation rod 1 can be moved smoothly conforming to the 3-dimensional configuration. In such a frictional agitation joining, since an attitude for welding is not limited to a specific one, shortening of a welding time and reduction in equipment cost for controlling an attitude of a part can be achieved. Also, the fully-encased sandwich structure or joining of members to be joined having different plate thicknesses can be attained very easily. Particularly, in a case of a part with a long welding length such as a part having a covered binding type fully-encased sandwich structure of the covered binding form, occurrence of weld strain in a melting weld is inevitable, but occurrence of the weld strain can be controlled largely in the above configuration, so that part accuracy can be improved and the number of accuracy control steps can be reduced largely. In addition, since the small-diameter portion of the agitation rod 1 and the shoulder face 4 thereof are respectively brought into contact with the end portion inner faces S1, S2 and the end faces E1, E2 individually, friction heat is securely applied to the end portion inner faces S1, S2 and the end faces E1, E2 so that the joining strength of the joint can further be improved.

Figure 8A:
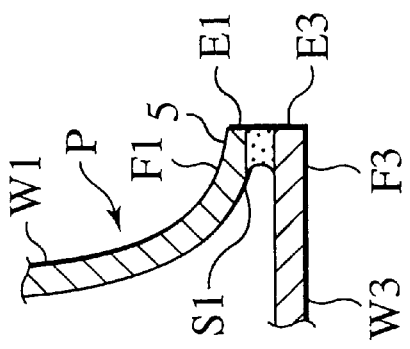
FIG. 8A is an explanatory view for explaining one step of steps of a frictional agitation joining method of a second embodiment of the present invention, the one step showing a state before joining.
Figure 8B:
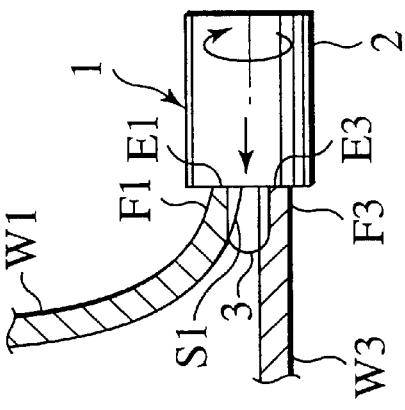
FIG. 8B is an explanatory view for explaining one step of steps of the frictional agitation joining method of the second embodiment of the present invention, the one step showing a state during joining.
Figure 8C:
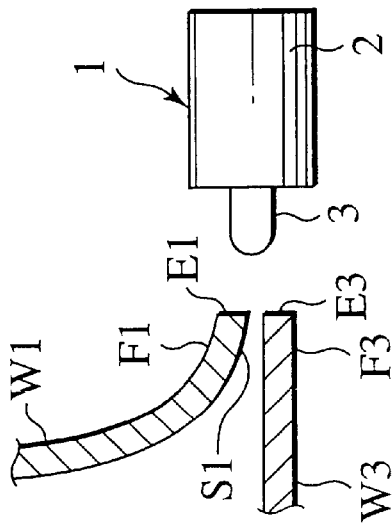
FIG. 8C is an explanatory view for explaining one step of steps of the frictional agitation joining method of the second embodiment of the present invention, the one step showing a state after joining.

FIGS. 8A to 8C show a second embodiment of the present invention, where in two sheets of members W1, W3 to be joined, a joining flange portion F3 of one member W3 thereof is made straight without curving the same.

FIGS. 9A to 9C show a third embodiment of the invention, where in two sheets of members W1, W4 to be joined, curved joining flange portions F1, F4 are formed but the two sheets of the members W1, W4 to be joined themselves are different in thickness from each other.

Even in these second and third embodiments, the frictional agitation joining can basically be performed according to the same procedure as that in the first embodiment.

Figure 10:
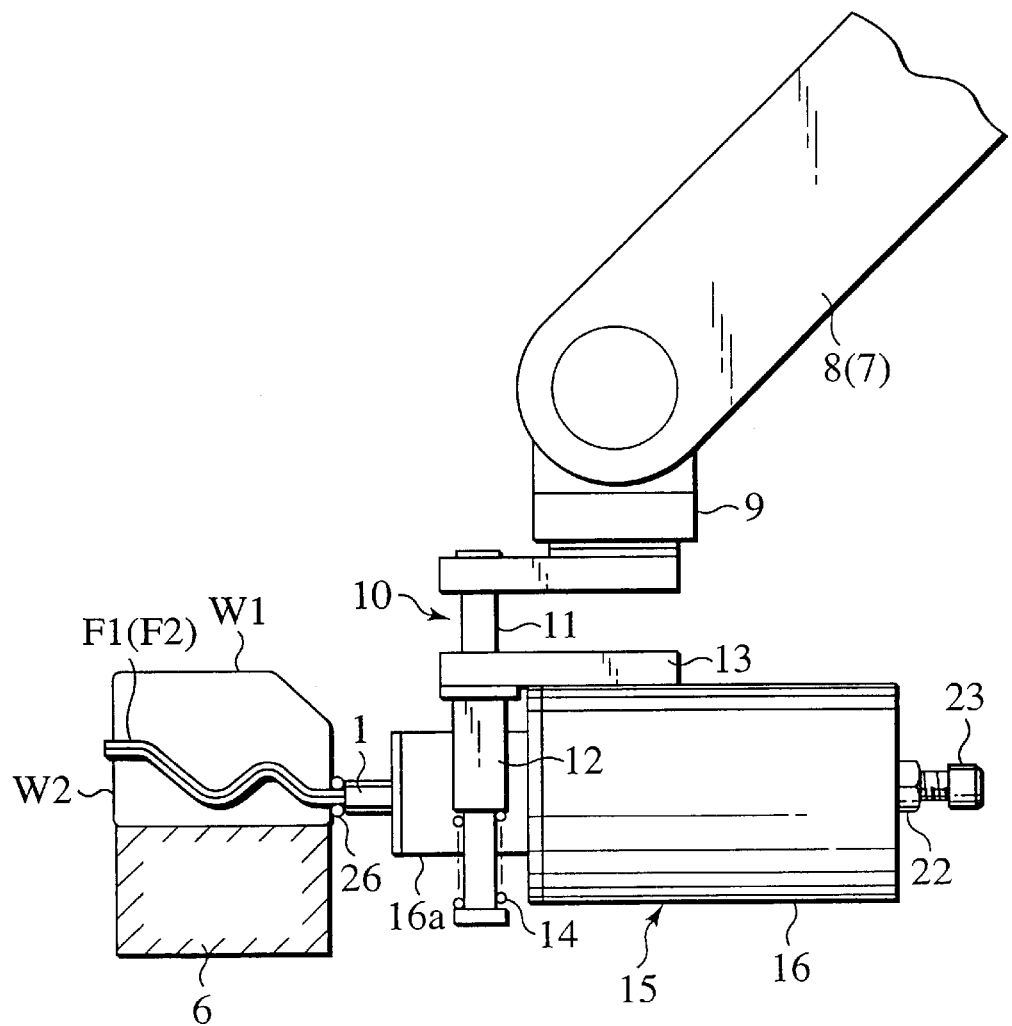
FIG. 10 is an explanatory enlarged view of one example of a frictional agitation joining apparatus of a robot type which is a fourth embodiment of the present invention.
Figure 11:
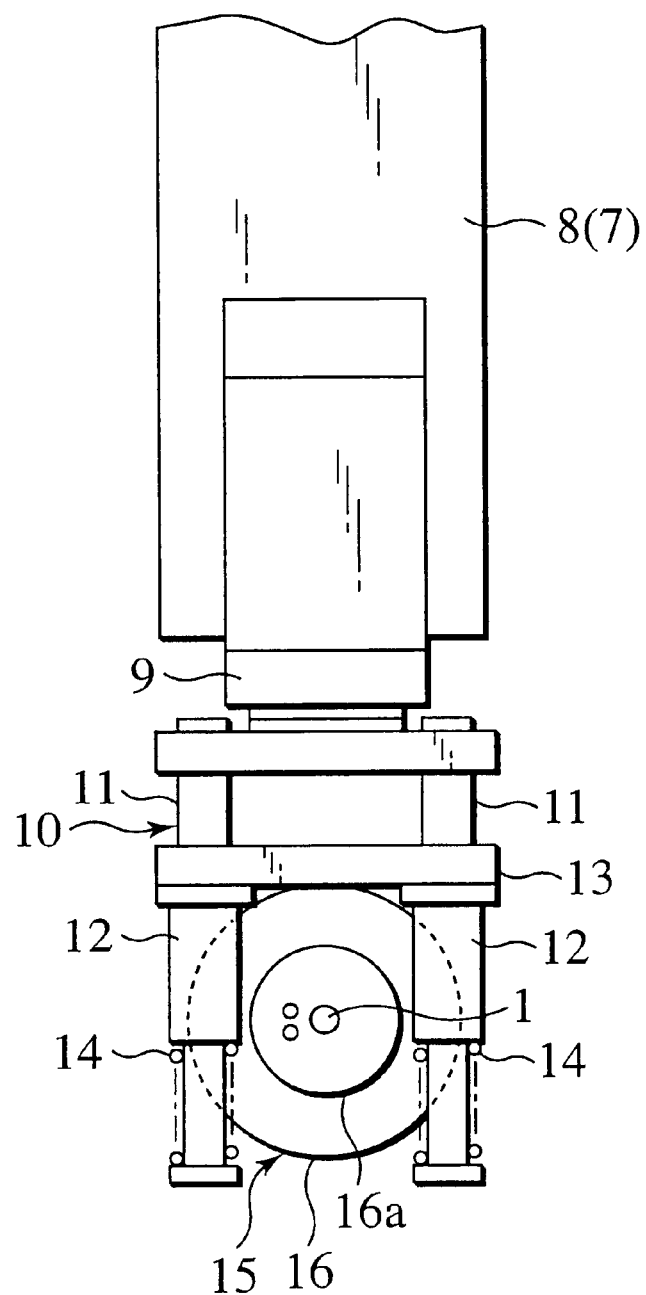
FIG. 11 is a left side view of the frictional agitation joining apparatus shown in FIG. 10.
Figure 12:
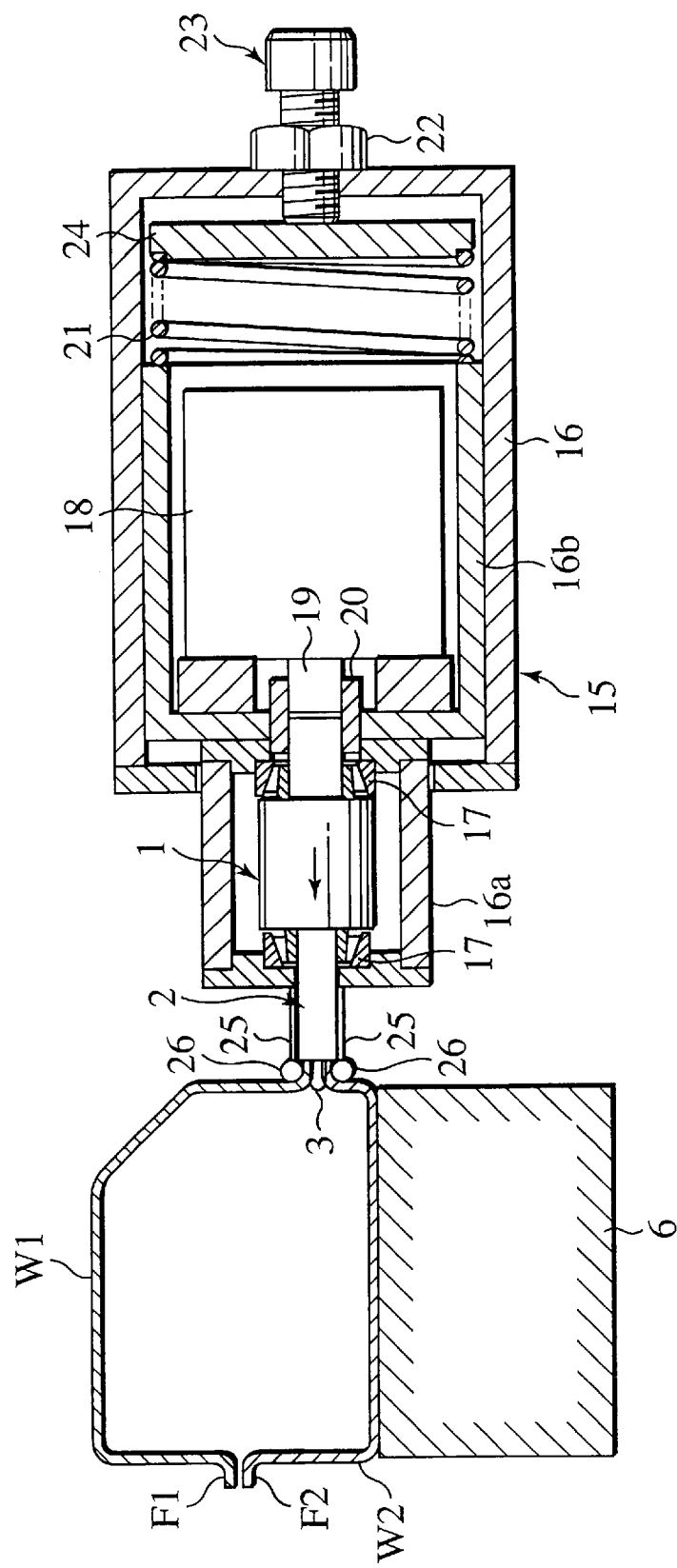
FIG. 12 is an explanatory sectional view of a frictional agitation joining head shown in FIG. 10.

FIGS. 10 to 12 show a preferable embodiment of a frictional agitation joining apparatus used for the above frictional agitation joining method.

Besides a work table 6 on which, for example, the above members W1, W2 are positioned and placed, this frictional agitation joining apparatus is mainly structured with an articulated type industrial robot (hereinafter, simply called a "robot"). Provided at a wrist portion 9 positioned at a distal end of a robot arm 8 of the robot 7 via a straight moving guide mechanism 10 is a frictional agitation joining head (hereinafter, simply called a "joining head") 15. The straight moving guide mechanism 10 is structured to cause two guide rods 11 which are parallel to each other and which are directed vertically to support a slider 13 with guide sleeves 12 movably in a vertical direction or in ascending/descending directions and cause the slider 13 to support a joining head 15 whose axial line is set in a horizontal direction. Compression coil springs 14 serving as resilient means is fitted to lower portions of the guide rods 11 which are positioned below the guide sleeves 12. As a result, the joining head 15 can be moved in the ascending/descending (vertical) direction in a floating manner.

Figure 14:
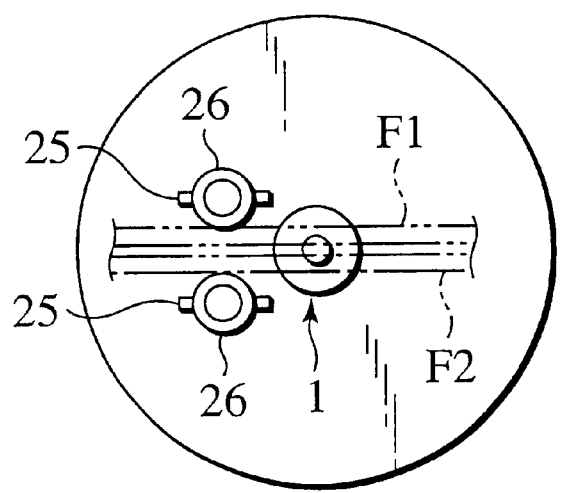
FIG. 14 is a left side view of the main portion shown in FIG. 13.

As shown in FIG. 12, the joining head 15 is structured to rotatably and slidably support the stepped shaft-shaped agitation rod 1 via a bearing 17 within a bearing box 16a positioned at a distal end of a case 16 which serves as a supporting member. As also shown in FIGS. 9 and 14, a projecting portion 3 which is the small-diameter portion is formed at a distal end of the agitation rod 1. Also, a driving motor 18 is housed in the case 16 in such a manner that it is supported by an auxiliary case 16b, and a rotation shaft 19 of the driving motor 18 is coupled to the agitation rod 1 via a coupling 20.

The auxiliary case 16b is slidable to the case 16, and a compression coil spring 21 is interposed between the auxiliary case 16b and an inner bottom face of the case 16. For this reason, the agitation rod 1 and the driving motor 18 are always biased towards the member W1, W2 to be joined by the compression coil spring 21. That is, a spring sheet 24 is disposed on a inner bottom side of the case 16 such that it is backed up by an adjusting bolt 23 with a lock nut 22, and the compression coil spring 21 is interposed between the spring sheet 24 and the auxiliary case 16b. The agitation rod 1 is resiliently biased in the above manner by the compression coil spring 21 and the biasing force of the spring 21 can be adjusted by advancing/retracting movement of the adjusting bolt 23.

Figure 13:
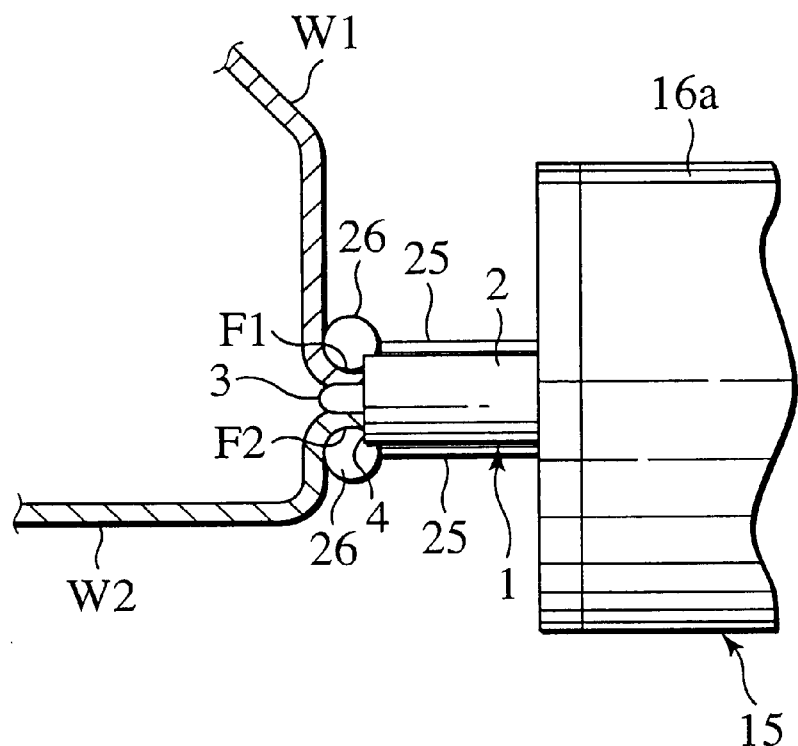
FIG. 13 is an enlarged view of a main portion of the frictional agitation joining head shown in FIG. 12.

Also, as shown in FIGS. 13 and 14, a pair of plate springs 25 which are resilient members are mounted in the bearing box 16a at the distal end of the case 16 adjacent to the agitation rod 1, and spherical guide rollers 26 is rotatably provided to distal ends of the respective plate springs 25. A resilient force is applied to the respective guide rollers 26 by the plate springs 25 such that the guide rollers 26 can hold the two joining flange portions F1, F2 from above and below. As shown in FIG. 14, the positions of the respective guide rollers 26 are set to be always positioned ahead of the agitation rod 1. From this, as mentioned below, the agitation rod 1 continuously passes through portions of the joining flange portions F1, F2 which are held by the pair of guide rollers 26 as if it pursuit them, thereby performing the frictional agitation joining.

Therefore, according to the embodiment, as shown in FIGS. 10 and 13, when the members W1, W2 to be joined are positioned on the work table 6 such that they are superimposed one on another and the robot 7 is actuated, the robot 7 moves the joining head 15 long the joining flange portions F1, F2 of the respective members W1, W2 at a predetermined velocity to perform a frictional agitation joining as if the joining flange portions F1, F2 are sewn to each other.

In such a frictional agitation joining apparatus, since the guide rollers 26 resiliently hold ambit of the flange portions F1, F2 serving as the connection joint, the copying guide function is developed, thereby facilitating a position control on the agitation rod 1 in a joining direction. Also, since the gap between the end portion inner faces is reduced because of the resilient holding force, an accuracy control on the gap can be facilitated, and a feeding velocity for joining can further be increased according to increase in friction heat between the agitation rod and the members to be joined due to the reduction in the gap while the number of rotations and the pressurizing force of the agitation rod 1 are maintained constant. In addition, the supporting rigidity of the supporting body is improved due to the resiliently holding force of the guide rollers 26 and chattering vibrations during the frictional agitation joining process can be suppressed, which can contribute to improvement in joining quality.

In particular, the robot 7 rotationally drives the agitation rod 1 according to actuation of the driving motor 18 (for example, at a speed of 100 to 2000 rpm or so) and moves the joining head 15 to a joining start position on a joining line of the members W1, W2 to be joined, and it inserts the projecting portion 3 of the agitation rod 1 in the gap between the joining flange portions F1, F2 so as to thrust the gap, as shown in FIG. 13. At this time, since the resiliently biasing force of compression coil force 21 acts on the agitation rod 1, the shoulder face 4 of the agitation rod 1 are forcible brought into contact with the end faces E1, E2 of the respective joining flange portions F1, F2, as shown in FIGS. 6A to 6C, and the agitation rod 1 is retracted relative to the case 16 to a position where the biasing force is balanced to a reaction force due to rigidity of the members W1, W2 to be joined and the agitation rod 1 is self-retained at the retracted position. Thereby, an insertion force or an insertion depth of the agitation rod 1 to the members W1, W2 to be joined is always kept constant, so that optimization of joining quality can be achieved. Incidentally, as a special property of the frictional agitation joining, the joining quality depends on only the pressurizing force (pushing-in amount) of the agitation rod 1 to the joining flange portions F1, F2 and the number of rotations of the agitation rod 1 but not the feeding velocity thereof, the feeding velocity can be set to an arbitrary value.

Also, in the above manner, the agitation rod 1 is inserted in between the joining flange portions F1, F2 and in parallel thereto the pair of guide rollers 26 hold the joining flange portions F1, F2 in the pressurizing manner, and substantially, the joining head 15 and the members W1, W2 to be joined are positioned relative to each other. At this time, the joining head 15 displaces slightly in a vertical direction in order to follow the shapes of the members W1, W2 to be joined faithfully, so that the displacement in the vertical direction is absorbed by the degree of freedom in floating of the straight moving guide mechanism 10 shown in FIGS. 10 and 11.

When the joining head 15 is moved 3-dimensionally along the joining flange portions F1, F2, the agitation rod 1 passes through the portions of the joining flange portions F1, F2 which are pressurized and held by the pair of rolling guide rollers 26 so as to pursuit them to perform the frictional agitation joining according to the forms shown in FIGS. 5A to 5C.

At this time, the moving locus of the agitation rod 1 depends on teaching data in the 3-dimensional direction of the robot 7. However, the so-called copying guide function is developed according to contact of the curved faces on the end portion inner faces S1, S2 of the joining flange portions F1, F2 and the projecting portion 3 of the agitation rod 1 and simultaneously the two compression coil springs 14, 21 are interposed between the agitation rod 1 and the robot 7 which is the mother machine, the agitation rod 1 moves faithfully in conformity with the 3-dimensional shapes of the joining flange portions F1, F2 on the actual members W1, W2 to be joined to perform the frictional agitation joining without being affected by an error in teaching data so that the joining or welding quality is stabilized remarkably. Also, in joining of such a 3-dimensionally curved joint, controlling on a joining direction can further be simplified.

Thus, according to this embodiment, the agitation rod 1 carried by the robot 7 is moved in conformity with the 3-dimensional shape of the joining flange portions F1, F2, so that the frictional agitation joining for the part P having the covered binding type fully-encased sandwich structure can be performed easily.

Incidentally, in this embodiment, the guide rollers 26 are positioned ahead of the agitation rod 1. However, in a case that change in the curvature of the joining flange portions F1, F2 is large, or the advancing direction of the agitation rod can be set to be both directions, the guide rollers 26 may be disposed on both sides of the shaft of the agitation rod 1 so as to be flush with it, considering the following-up property of the agitation rod 1.

Figure 15A:
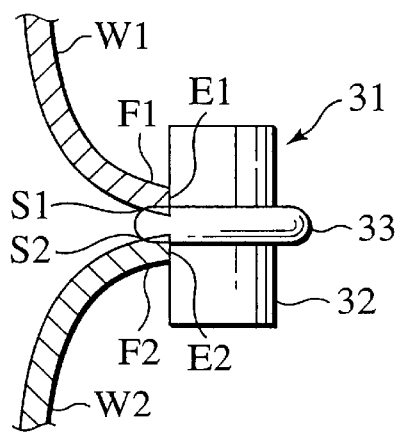
FIG. 15A is an explanatory view for explaining one of steps of a frictional agitation joining method showing a fifth embodiment of the present invention.
Figure 15B:
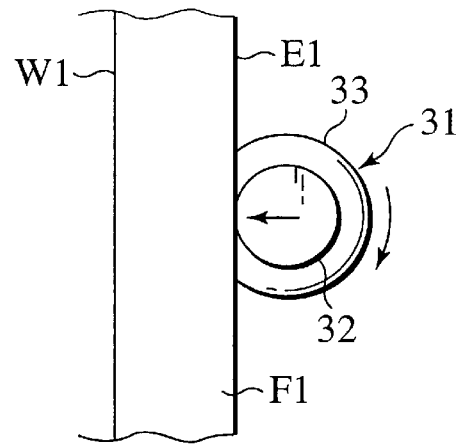
FIG. 15B is a top view in FIG. 15A.

FIGS. 15A and 15B shows a fifth embodiment of the present invention (FIG. 15B is a top view). As apparent from comparison with the first embodiment shown in FIGS. 5A to 5C, the fifth embodiment is structured such that a roller-shaped rod formed on a cylindrical outer peripheral face 32 thereof with a flange portion 33 serving as a disc-like projecting portion is used as an agitation rod 31, the flange portion 33 is inserted in a gap between the end portion inner faces S1, S2 of the joining flange portions F1, F2 while the cylindrical outer peripheral face 32 is brought in contact with the end faces E1, E2 of the respective joining flange portions F1, F2, the above roller-shaped agitation rod 31 is rolled along the end faces E1, E2 of the joining flange portions F1, F2 so that the frictional agitation joining is performed.

Therefore, according to this embodiment, since the rigidity of the flange portion 33 which serves as the projecting portion is higher than the so-called pin type agitation rod 1 in the first embodiment, there is an advantage that the frictional agitation joining can securely be performed, even when the plate thickness of the mother plate is thinner than that in the first embodiment and the gap between the opposed joining flange portions F1, F2 is smaller than that in the first embodiment.

Figure 1:
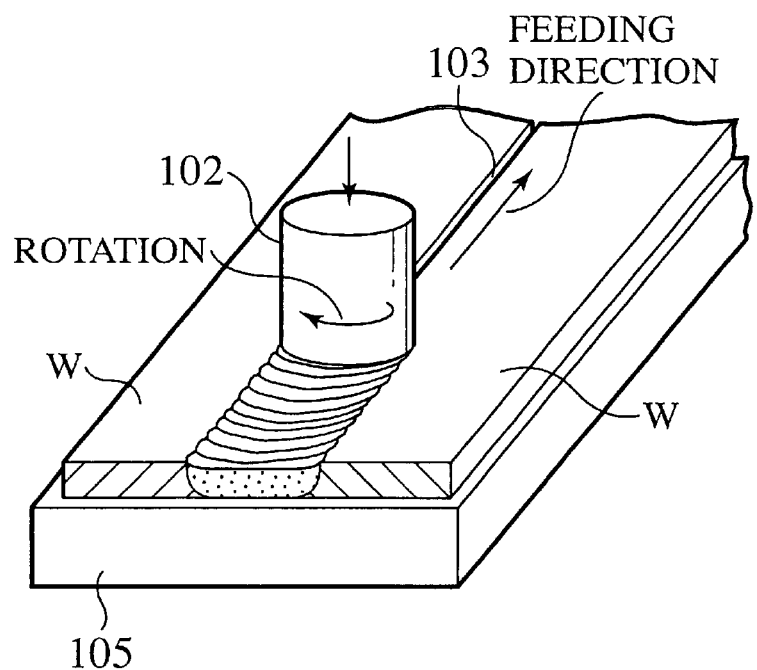
FIG. 1 is a perspective view of a main portion showing a fundamental principle of a frictional agitation joining method.
Figure 2:
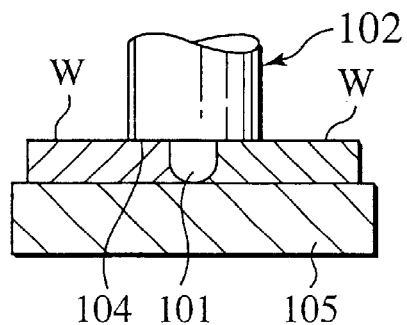
FIG. 2 is an explanatory cross-sectional view of the main portion shown in FIG. 1.
Figure 3:
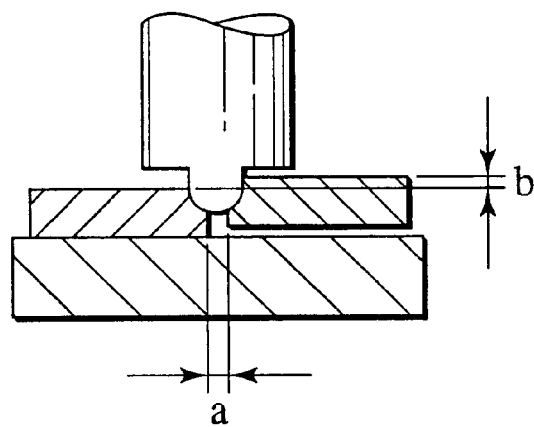
FIG. 3 is an explanatory cross-sectional view of another example of a related frictional agitation joining method.
Figure 4:
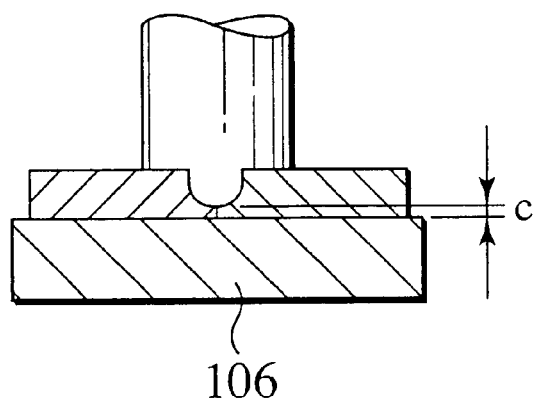
FIG. 4 is an explanatory cross-sectional view of still another example of a related frictional agitation joining method.
Figure 16:
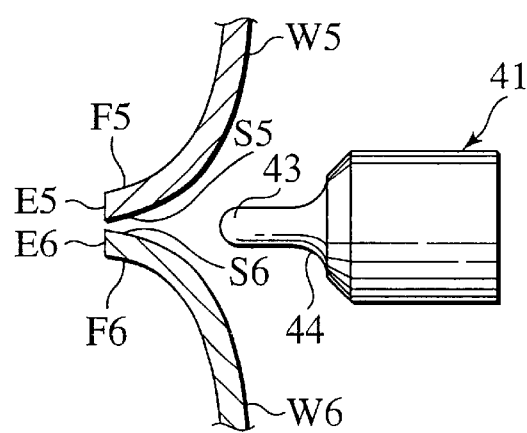
FIG. 16 is an explanatory view for explaining one of steps of a frictional agitation joining method showing a fifth embodiment of the present invention.

FIG. 16 shows a sixth embodiment. As apparent from a comparison with the first embodiment shown in FIG. 1, this embodiment is different from the first embodiment in that an agitation rod 41 is inserted between a gap between opposed joining flange portions F5, F6, which are not outwardly flanged types but inwardly flanged types, of members W5, W6 to be joined from a direction reversed to end faces E5, E6 of the respective flange portions F5, F6. In the agitation rod 41, a shoulder face 44 at a proximal end portion of a projecting portion 43 is formed so as to conform with the curvature of end portion inner faces S5, S6 of the joining flange portions F5, F6.

Therefore, according to this embodiment, it is effective in joining for a case that the shapes of the joining flange portions F5, F6 are not of an outwardly projecting type but of an inwardly projecting type, and a matching property in shape between the joining flange portions F5, F6 and the projecting portion 43 the agitation rod 41 is excellent, so that positioning of the agitation rod 41 to the member W5, W6 to be joined at starting position of joining is facilitated and the so-called copying guide function is developed more effectively during movement of the agitation rod 41.

The entire content of a Japanese Application No. P2001-036326 with a filing date of Feb. 14, 2001 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A method of frictional agitation joining comprising:
   superimposing two plate-shaped members to be joined such that both end faces form an edge joint; and
   joining the end faces of both the members to be joined and end portion inner faces of the members which are opposed to each other near the end faces by applying frictional agitation energy to the end faces and the end portion inner faces, respectively, wherein
   the joining step further includes inserting a small-diameter portion of an agitation rod of a stepped shaft type to an opposition gap between the end portion inner faces; and joining two plate-shaped members to be joined by moving the small-diameter portion of the agitation rod along the end faces while rotationally driving the small-diameter portion of the agitation rod; wherein at least one of the end portion inner faces opposed to each other is curved or inclined so that an opposition gap between the end portion inner faces is gradually reduced towards the end faces, and a length of the small-diameter portion of the agitation rod is set to be larger than a joining depth between the end portion inner faces.

2. A frictional agitation joining apparatus for a frictional agitation joining method according to claim 1, comprising:

an agitation rod;

a supporting member which supports the agitation rod rotatably; and guide rollers which resiliently hold regions of the two members to be joined which form a connection joint in order to cause end portion inner faces of the members to approach each other.

3. A frictional agitation joining apparatus for a frictional agitation joining method, comprising:

an agitation rod;

a supporting member which supports the agitation rod rotatably; and guide rollers which resiliently hold regions of two members to be joined which form a connection joint in order to cause end portion inner faces of the members to approach each other, wherein the supporting member supporting the agitation rod transversely such that the axial center line of the agitation rod becomes generally horizontal is resiliently supported to a wrist portion of an industrial robot which is a mother machine via a straight moving guide mechanism such that the supporting member is movable upward and downward in a floating manner.

4. A frictional agitation joining apparatus according to claim 3, wherein the agitation rod is slidably supported to the supporting member and a resilient member which always biases the agitation rod towards the members to be joined is provided.

5. A frictional agitation joining apparatus for a frictional agitation joining method, comprising:

an agitation rod;

a supporting member which supports the agitation rod rotatably; and guide rollers which resiliently hold regions of two members to be joined which form a connection joint in order to cause end portion inner faces of the members to approach each other, wherein the agitation rod is slidably supported to the supporting member and a resilient member which always biases the agitation rod towards the members to be joined is provided, and wherein a biasing force applied to the agitation rod by the resilient member is adjustable.

6. A method of frictional agitation joining comprising:

superimposing two plate-shaped members to be joined to form an edge joint; and joining the end faces of both the members to be joined and end portion inner faces of the members which are opposed to each other near the end faces by applying frictional agitation energy to the end faces and the end portion inner faces, respectively, wherein the joining step further comprises bringing a cylindrical outer peripheral face of a roller-shaped agitation rod formed on the cylindrical outer peripheral face with a disc-shaped flange portion in contact with the end faces of the members to be joined and inserting the flange portion into an opposition gap between the end portion inner faces and rolling the agitation rod along the end faces to perform joining.

7. A method of frictional agitation joining comprising:

superimposing two plate-shaped members to be joined to form an edge joint; and joining the end faces of both the members to be joined and end portion inner faces of the members which are opposed to each other near the end faces by applying frictional agitation energy to the end faces and the end portion inner faces, respectively; wherein at least one of the end portion inner faces opposed to each other is curved or inclined so that an opposition gap between the end portion inner faces is gradually reduced towards the end faces;

the method further comprising inserting an agitation rod with the same sectional shape as that of the opposition gap into the opposition gap from the back side of the end faces, and joining two plate-shaped members to be joined by moving the agitation rod while rotationally driving the agitation rod.

8. A method of frictional agitation joining comprising:

superimposing two plate-shaped members to be joined such that both end faces form an edge joint; and joining the end faces of both the members to be joined and end portion inner faces of the members which are opposed to each other just near the end faces by applying frictional agitation energy to the end faces and the end portion inner faces, respectively; wherein joining further includes inserting a small-diameter portion of an agitation rod of a stepped shaft type into an opposition gap between the end portion inner faces; and joining the two plate-shaped members to be joined by moving the small-diameter portion of the agitation rod along the end faces while rotationally driving the small-diameter portion of the agitation rod, wherein;

a length of the small-diameter portion of the agitation rod is set to extend past a joining depth between the end portion inner faces during joining.

9. A method of frictional agitation joining according to claim 8, wherein at least one of the end portion inner faces opposed to each other is curved or inclined so that an opposition gap between the end portion inner faces is gradually reduced towards the end faces.

* * * * *